United States Patent
Oba et al.

(10) Patent No.: US 6,953,054 B2
(45) Date of Patent: Oct. 11, 2005

(54) RELIEF VALVE

(75) Inventors: Kenzo Oba, Tochigi (JP); Takeshi Ueki, Tochigi (JP); Morihito Ichizuki, Tochigi (JP)

(73) Assignee: Showa Corporation, Saitama (JP)

( * ) Notice: Subject to any disclaimer, the term of this patent is extended or adjusted under 35 U.S.C. 154(b) by 33 days.

(21) Appl. No.: 10/727,795

(22) Filed: Dec. 4, 2003

(65) Prior Publication Data

US 2005/0051218 A1 Mar. 10, 2005

(30) Foreign Application Priority Data

Jan. 17, 2003 (JP) .......................... 2003-010379
Jun. 24, 2003 (JP) .......................... 2003-180204

(51) Int. Cl.⁷ .............................................. F16K 15/04
(52) U.S. Cl. ................... 137/539.5; 277/438; 277/576
(58) Field of Search ............................... 277/436, 437, 277/438, 576, 577, 549, 590, 644; 137/539.5, 539

(56) References Cited

U.S. PATENT DOCUMENTS

| | | | | |
|---|---|---|---|---|
| 2,914,085 | A | * 11/1959 | Mercier | ...................... 137/514 |
| 6,196,201 | B1 | 3/2001 | Fehlmann et al. | |
| 6,497,247 | B1 | 12/2002 | Kinoshita et al. | |
| 6,851,449 | B2 | * 2/2005 | Kleibrink | ................. 137/539.5 |
| 2001/0052361 | A1 | * 12/2001 | Kushida et al. | .......... 137/539.5 |

FOREIGN PATENT DOCUMENTS

| | | |
|---|---|---|
| JP | 5623765 | 3/1981 |
| JP | 2875852 | 1/1999 |

* cited by examiner

Primary Examiner—Ramesh Krishnamurthy

(57) ABSTRACT

A relief valve is provided with an elastic body seal sealed into an annular gap between a ball receiver and a valve hole, and is slidably in contact with an inner periphery of the valve hole such that the elastic body seal is not compressed in an axial direction of the ball receiver.

15 Claims, 5 Drawing Sheets

RELIEF VALVE

BACKGROUND OF THE INVENTION

1. Field of the Invention

The present invention relates to a relief valve used in a hydraulic control system, in particular in a hydraulic system of a power steering apparatus for a vehicle.

2. Description of the Related Art

As a general structure of a conventional relief valve, there is a structure disclosed in Japanese Utility Model Application No. 56-23765 (reference document 1). This conventional relief valve is provided with a valve housing in which a valve hole is pierced along an axis, and a valve seat member fitted and fixed to an opening end portion of the valve hole. Pressurized oil discharged from a hydraulic pump is introduced to one end portion of a communication hole penetrating along an axis. A valve seat is formed in another end portion, and a ball is brought into contact with the valve seat so as to close the communication hole. A ball receiver holding the ball is slidably supported along an inner surface of the valve hole. A relief spring energizes the ball receiver in a direction in which the ball is brought into contact with the valve seat, and a relief hole relieving the pressure oil at the time of relieving the pressure oil is open in a radial direction of the valve hole. However, in this structure, the ball receiver resonates based on a vibration generated in the vane pump, and this generates a bleep sound.

Accordingly, as a relief valve for preventing the ball receiver from vibrating, there is a relief valve in which a vibration preventing ring constituted by a rubber O-ring and a PTFE ring is interposed between the ball receiver and the relief spring, as described in Japanese Patent No. 2875852 (reference document 2). The vibration preventing ring is brought into contact with the inner surface of the valve hole by pressing the vibration preventing ring against the ball receiver by the relief spring and setting the rubber O-ring of the vibration preventing ring to an expanded state, thereby preventing the ball receiver from vibrating.

In the relief valve described in reference document 2, the rubber O-ring of the vibration preventing ring is compressed in the axial direction between the rubber O-ring and the ball receiver by the relief spring so as to be set in the expanded state in the diametrical direction. The O-ring in the compressed and expanded state generates a sticking phenomenon based on a hardening of the rubber during low oil temperature conditions, and there is a risk that the oil pressure is not relieved even when the oil pressure gets over a set pressure. In this case, a burden is imposed on the other portions. Further, operation of the relief valve is not normally performed due to a change in the set pressure caused by a long time deterioration, and there is generated a phenomenon that oil leakage is generated in the cylinder and the pump.

SUMMARY OF THE INVENTION

The object of the present invention is to inhibit the ball receiver from vibrating, and to make the relief pressure stable in the relief valve.

The present invention relates to a relief valve having a valve housing in which a valve hole is pierced along an axis. A valve seat member is fitted and fixed to an opening end portion of the valve hole, and in which pressurized oil discharged from a hydraulic pump is introduced to one end portion of a communication hole penetrating along an axis. A valve seat is formed in another end portion. A ball is brought into contact with the valve seat to close the communication hole. A ball receiver holds the ball and is slidably supported along an inner surface of the valve hole. A relief spring energizes the ball receiver in a direction in which the ball is brought into contact with the valve seat. A relief hole relieves the pressurized oil at the appropriate time, the relief hole being open in a radial direction of the valve hole. An elastic body seal is provided so as to be sealed in an annular gap between the ball receiver and the valve hole. The relief valve is slidably in contact with at least one of an outer periphery of the ball receiver and an inner periphery of the valve hole such that the elastic body seal is not compressed in an axial direction of the ball receiver.

BRIEF DESCRIPTION OF THE DRAWINGS

The present invention will be more fully understood from the detailed description given below and from the accompanying drawings which should not be taken to be a limitation on the invention, but are for explanation and understanding only.

The Drawings.

DESCRIPTION OF THE PREFERRED EMBODIMENTS

Figure 1:
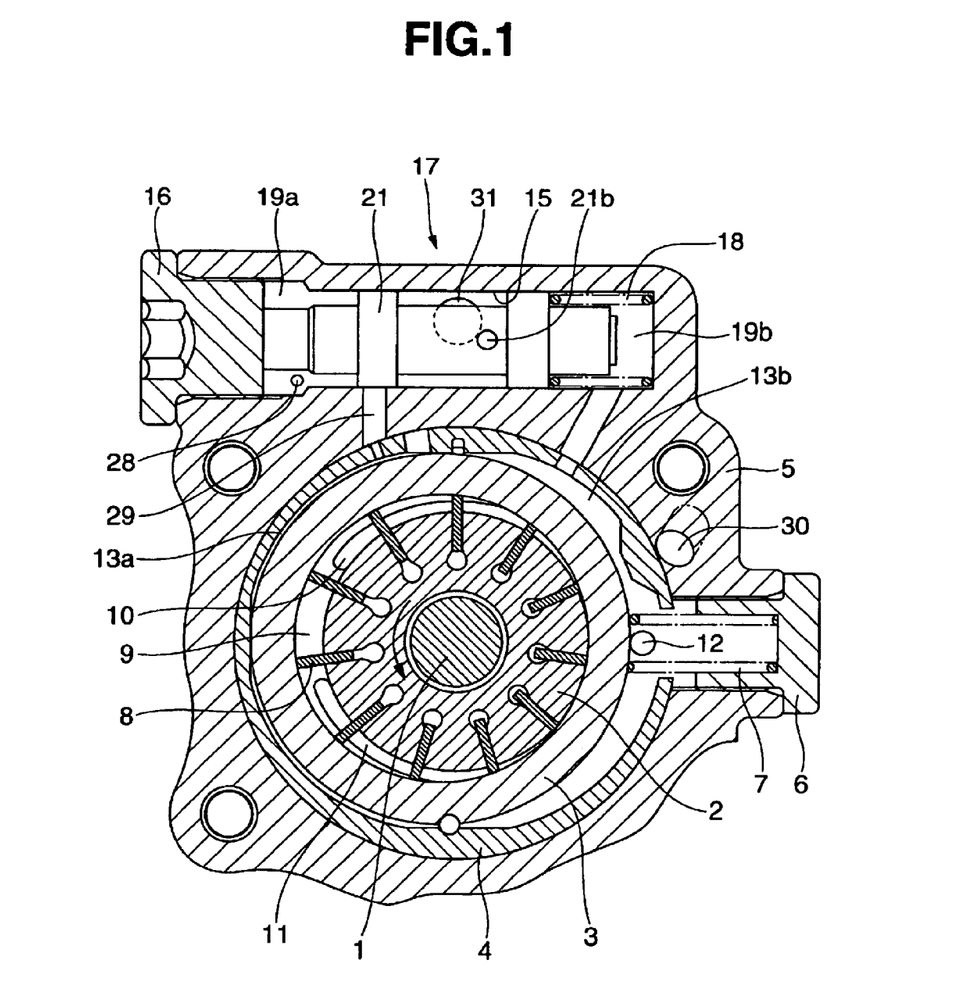
FIG. 1 is a cross sectional view showing a variable displacement type pump.
Figure 2:
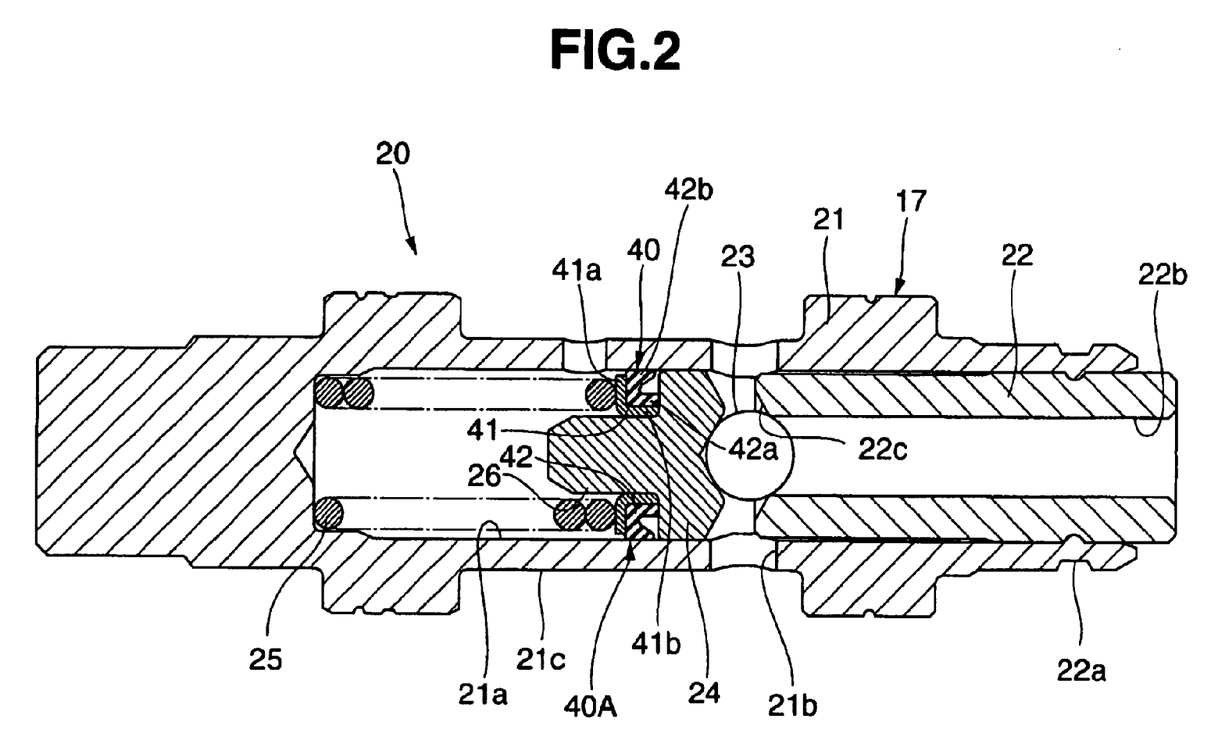
FIG. 2 is a cross sectional view showing a relief valve in accordance with a first embodiment.
Figure 3:
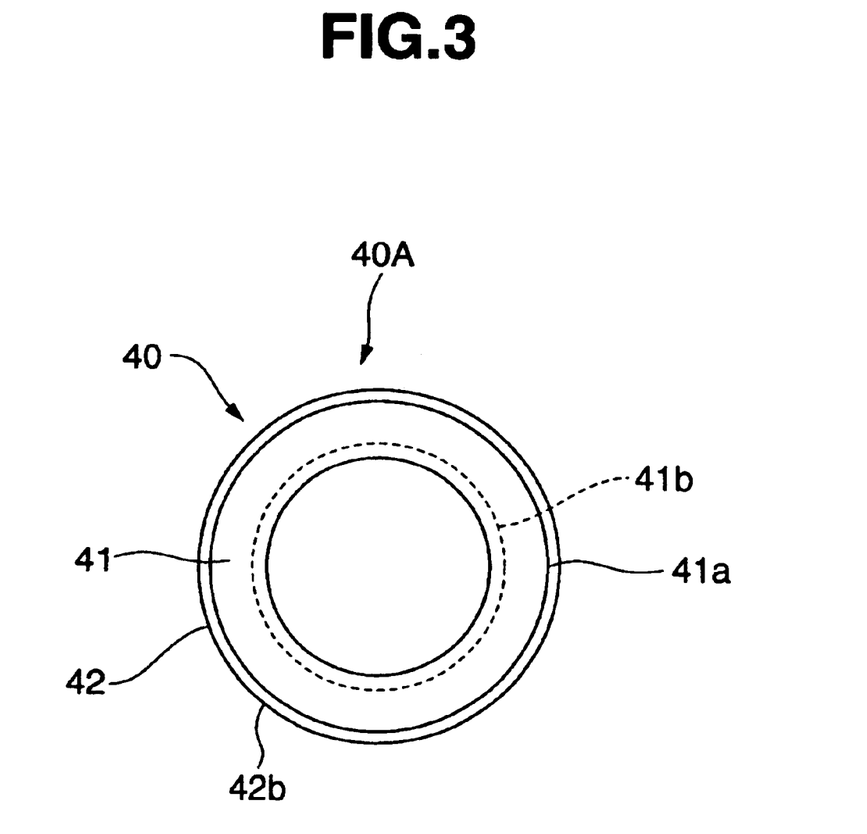
FIG. 3 is a front elevational view showing an oil seal.

First Embodiment—FIGS. 1 to 3

A variable displacement type pump in FIG. 1 corresponds to one embodiment of a vane type variable displacement pump constituting an oil pressure generating source of a power steering apparatus for a vehicle, and is structured such that a relief valve 20 is arranged within a switching valve 17 for controlling a pressure of a first fluid chamber.

In this drawing, a rotor 2 mounted to a pump rotation shaft 1 rotates in an eccentric cam ring 3 and forms a pump chamber 9 between the rotor 2 and the cam ring 3, and the cam ring 3 is supported to a pump housing 5 via an outer case 4. Reference numeral 6 denotes a pump housing cap, and reference numeral 7 denotes a preload spring.

A plurality of vanes 8 are mounted to an outer periphery of the rotor 2 in a circumferential direction, and a leading end of the vane 8 is in contact with an inner peripheral surface of the cam ring 3. In this case, when the rotor 2 is rotated, a working fluid sucked from a suction port 10 is discharged from a discharge port 11 via a pump chamber 9. The working fluid discharged from the discharge port 11 is fed to external equipment through a variable orifice 12 via a discharge passage 30.

Reference numeral 15 denotes a valve storage hole provided in a part of the pump housing 5 and having one end portion (a left end in the drawing) closed by a filling plug 16. A valve body 21 of the switching valve 17 is received in the valve storage hole 15, and is energized toward the filling plug 16 by a switching valve spring 18. Fluid pressure in an upstream side of the variable orifice 12 provided in a pump discharge side passage is applied to a first valve chamber 19a formed in a left side of the valve body 21 of the switching valve via a passage 28, and fluid pressure in a downstream side of the variable orifice 12 is applied to a second valve chamber 19b formed in a right side of the valve body 21 of the switching valve.

When the rotation of the pump becomes high, the pressure of the first valve chamber 19a in the left side of the valve body 21 of the switching valve becomes high, so that the valve body 21 of the switching valve moves to a right side, shown in the drawing, against a force of the switching valve spring 18. Accordingly, a passage 29 is open to the first valve chamber 19a, and the working fluid within the first valve chamber 19a is introduced to the first fluid chamber 13a between the cam ring 3 and the outer case 4 through the passage 29. Alternatively, the pressure in the downstream side of the variable orifice 12 is introduced to the second fluid chamber 13b. As mentioned above, since the pressures in the front side and the back side of the variable orifice 12 are respectively introduced to the first fluid chamber 13a and the second fluid chamber 13b during high speed rotation, the cam ring 3 deviates due to a differential pressure, an area of the suction port 10 is reduced, and a discharging amount of the pump is reduced.

FIG. 2 is an enlarged cross sectional view picking up and showing the valve body 21 of the switching valve 17, as an embodiment in accordance with the present invention. The switching valve 17 has a relief valve 20 arranged in the switching valve 17, and the valve body 21 of the switching valve also forms a housing of the relief valve 20. A valve hole 21a is pieced along an axis of the relief valve housing 21. A valve seat member 22 is fitted and inserted to an opening end portion of the valve hole 21a, and is fixed in accordance with a caulking procedure at a position shown by reference symbol 22a. A communication hole 22b passing through an axis is disposed in the valve seat member 22. One end portion (a right end in the drawing) of the communication hole 22b is open to the second valve chamber 19b in FIG. 1. The pressure in the downstream side of the variable orifice 12 is introduced to one end portion, and a valve seat 22c is formed in another end portion (a left end in the drawing).

Reference numeral 23 denotes a ball which is brought into contact with the valve seat 22c so as to close the communication hole 22b. Reference numeral 24 denotes a ball receiver which holds the ball 23. The ball receiver 24 is supported so as to freely slide along an inner surface of the valve hole 21a. Further, the ball receiver 24 is energized in a direction (a right side in the drawing) in which the ball 23 is brought into contact with the valve seat 22c, by a relief spring 25. The ball receiver 24 is provided with a small diameter portion 26 to which the relief spring 25 is inserted and attached, on a back surface thereof.

In the present embodiment, an oil seal 40 constituting an elastic body seal 40A in accordance with the present invention is interposed between the ball receiver 24 and the relief spring 25. The oil seal 40 is inserted and attached to a periphery of a small diameter portion 26 provided on the back surface of the ball receiver 24 in a protruding manner so as to be borne.

The oil seal 40 is provided with a rubber seal lip 42 in an outer periphery of a core bar 41. The cored bar 41 has a flange portion 41a and a rising tubular portion 41b, which sets an outward surface of the flange portion 41a as a spring receiving surface for the relief spring 25. The cored bar 41 inserts the small diameter portion 26 of the ball receiver 24 to an inner periphery of the rising tubular portion 41b. The cored bar 41 brings a leading end surface of the rising tubular portion 41b into contact with a back surface of the ball receiver 24.

Accordingly, the oil seal 40 as the elastic body seal 40A is sealed in an annular gap between the ball receiver 24 and the valve hole 21a such that the oil seal 40 is borne in a side of the ball receiver 24.

The oil seal 40 brings the rising tubular portion 41b of the cored bar 41 into contact with the back surface of the ball receiver 24 so as to align in an axial direction, and sets the flange portion 41a as a spring receiver for the relief spring 25. The oil seal 40 integrally forms a base portion 42a of the seal lip 42 on an outer periphery of the rising tubular portion 41b in accordance with a baking adhesion while the seal lip 42 is arranged in the outer periphery of the cored rod 41. A leading end portion 42b is expanded toward an obliquely outer side from an inward surface of the flange portion 41a.

In the oil seal 40, a rising height in an axial direction of the leading end portion 42b of the seal lip 42 with respect to the flange portion 41a of the cored rod 41 is set lower than a rising height of the rising tubular portion 41b with respect to the flange portion 41a. An outer diameter of the leading end portion 42b of the seal lip 42 in a free state is set larger than an inner diameter of the valve hole 21a, and the leading end portion 42b is fitted to the valve hole 21a in a compressed state. Accordingly, the leading end portion 42b of the seal lip 42 in the oil seal 40 is slidably in contact with the inner periphery of the valve hole 21a such that the leading end portion 42b is not compressed in the axial direction of the ball receiver 24. The non-compressed state means a state in which the seal lip 42 is not clamped in the axial direction between the back surface of the ball receiver 24 and the flange portion 41a of the cored bar 41 functioning as the spring receiver of the relief spring 25, and is not compressed.

Further, a relief hole 21b is provided in a radial direction in the relief valve housing 21 near the valve seat 22c, and is communicated with an annular notch 21c provided all around a circumference on an outer peripheral surface of the valve housing 21. The annular notch 21c is communicated with a drain passage 31 shown in FIG. 1 or a suction port of the hydraulic pump.

The relief valve 20 in the variable displacement type pump aims to set a stable relief pressure which is an excessive fluid pressure in a pump discharge side. When the fluid pressure in the pump discharge side is equal to or less than a set pressure, the ball 23 is brought into contact with the valve seat 22c by a force generated by the relief spring 25, and the valve is closed.

When the fluid pressure in the pump discharge side is excessive, such as during dry turning of the steering by a power steering apparatus, the pressure in the second valve chamber 19b communicates with a discharge passage 30 in a downstream side of the variable orifice 12. Pressure within the communication hole 22b overcomes the relief set pressure, so that the ball 23 moves to a left side in the drawing against the force of the relief spring 25, and the valve is opened. Accordingly, the pressure oil within the second valve chamber 19b is relieved from the communication hole 22b to the relief hole 21b, the annular notch 21c and the drain passage 31. When the pressure within the second valve chamber 19b is lowered accordingly to be equal to or less than the set value, the ball 23 is again pressed to the valve seat 22c by the relief spring 25, the valve is closed, and the flow of the pressure oil is stopped.

In accordance with the present embodiment, the following operations and effects can be obtained.

(1) Since the oil seal 40 corresponding to the elastic body seal 40A is sealed in the annular gap between the ball receiver 24 and the valve hole 21a, the seal lip 42 of the oil seal 40 is brought into contact with the inner surface of the valve hole 21a such that the seal lip 42 is not compressed in the axial direction of the ball receiver 24. It is possible to inhibit the ball receiver 24 from vibrating, and it is possible to inhibit the generation of a bleep sound. Accordingly, the seal lip 42 is not hardened by the low temperature of the oil under the compressed state, and it is possible to set a stable relief pressure.

(2) The oil seal 40 is borne to the side of the ball receiver 24. This structure is simple in comparison with the structure in which the oil seal 40 is borne in the side of the valve hole 21a of the valve housing 21.

(3) The oil seal 40 is provided with the seal lip 42 in the outer periphery of the cored rod 41. Accordingly, even when the relief spring 25 presses the oil seal 40, the spring force of the relief spring 25 is used as a force for clamping the cored rod 41 with respect to the ball receiver 24, and does not constitute a force for compressing the seal lip 42. Therefore, the seal lip 42 is not hardened by the low temperature of the oil under the compressed state, and it is possible to set a stable relief pressure. Further, even when the valve housing 21 is made of aluminum, the oil seal 40 does not injure the inner surface of the valve hole 21a.

(4) The outer diameter of the seal lip 42 in the oil seal 40 in the free state is made larger than the inner diameter of the valve hole 21a: Accordingly, the seal lip 42 is closely in contact with the inner surface of the valve hole 21a based on the elastic force of the seal lip 42, thereby securely inhibiting the vibration and inhibiting the generation of the bleep sound.

(5) Since the cored rod 41 of the oil seal 40 is formed as the spring receiver for the relief spring 25, it is not necessary to independently provide a special spring receiver for the relief spring 25, and the structure can be made simple.

Figure 4:
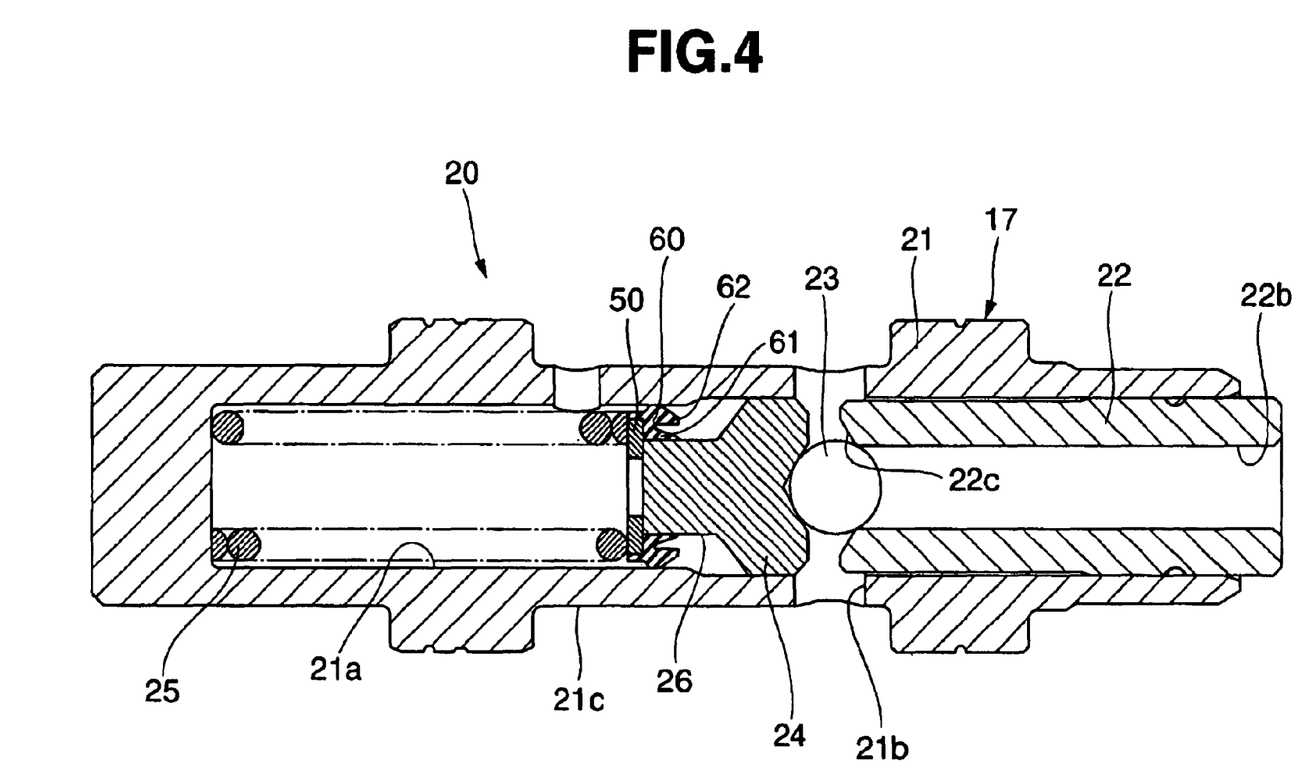
FIG. 4 is a cross sectional view showing a relief valve in accordance with a second embodiment.
Figure 5:
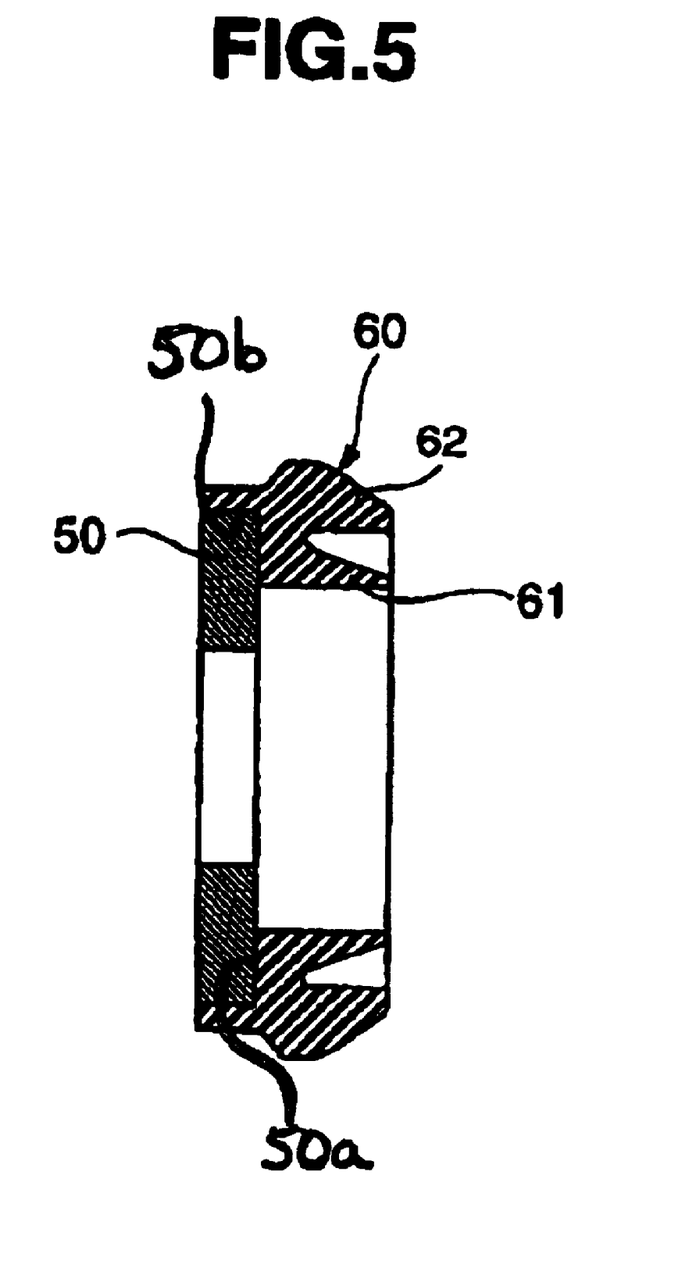
FIG. 5 is a cross sectional view showing a connected body of a spring receiver and an elastic seal.

Second Embodiment—FIGS. 4 and 5

A relief valve 20 in accordance with a second embodiment is substantially different from the relief valve 20 in accordance with the first embodiment, in that a spring receiver 50 and an elastic body seal 60 are provided in the ball receiver 24, in place of the elastic body seal 40A (the oil seal 40) provided in the ball receiver 24 in accordance with the first embodiment.

The spring receiver 50 is formed in a porous disc shape, is provided with a center hole having a smaller diameter than that of the small diameter portion 26 of the ball receiver 24, and has an outer peripheral diameter larger than the small diameter portion 26 and smaller than the valve hole 21a.

The elastic body seal 60 is constituted by an annular portion in an outer peripheral side of one plate surface 50a of the spring receiver 50, and a rubber body which is integrally formed around an outer peripheral portion 50b of the spring receiver 50 in accordance with a baking adhesion or the like so as to be borne. In this case, the elastic body seal 60 may be an independent body from the spring receiver 50. The elastic body seal 60 is provided with an inner peripheral wall 61 fitted to the outer periphery of the small diameter portion 26 when one plate surface of the spring receiver 50 is brought into contact with an end surface of the small diameter portion 26 of the ball receiver 24 so as to align in an axial direction. A seal up 62 is expanded from a base portion of the inner peripheral wall 61 toward an outer side via an annular space.

The elastic body seal 60 is sealed in the annular gap between the ball receiver 24 and the valve hole 21a such that the elastic body seal 60 is integrally formed in the spring receiver 50 in the manner mentioned above, where the elastic body seal 60 is fitted to the small diameter portion 26 of the ball receiver 24 so as to be borne. The spring receiver 50 is brought into contact with the end surface of the small diameter portion 26 of the ball receiver 24 so as to be aligned in the axial direction, which forms the spring receiver for the relief spring 25.

In the elastic body seal 60, the inner peripheral wall 61 and the seal lip 62 of the elastic body seal 60 are made sufficiently apart from the back surface of the ball receiver 24, such that the elastic body seal 60 is borne to the small diameter portion 26 of the ball receiver 24 together with the spring receiver 50. The outer diameter of the seal lip 62 is set larger than the inner diameter of the valve hole 21a in the free state, and the seal lip 62 is fitted into the valve hole 21a such that the seal lip 62 is compressed. Accordingly, the seal lip 62 of the elastic body seal 60 is slidably in contact with the inner periphery of the valve hole 21a such that the seal lip 62 is not compressed in the axial direction of the ball receiver 24. The non-compressed state means a state in which the seal lip 62 is clamped between the back surface of the ball receiver 24 and the spring receiver 50 of the relief spring 25 in the axial direction, and is not compressed.

In accordance with the present embodiment, the following operations and effects can be obtained.

(1) Since the elastic body seal 60 is sealed in the annular gap between the ball receiver 24 and the valve hole 21a, and the seal lip 62 of the elastic body seal 60 is brought into contact with the inner surface of the valve hole 21a such that the seal lip 62 is not compressed in the axial direction of the ball receiver 24, it is possible to inhibit the ball receiver 24 from vibrating, and it is possible to inhibit the generation of the bleep sound.

(2) The elastic body seal 60 is borne to the side of the ball receiver 24. This structure is simple in comparison with the structure in which the elastic body seal 60 is borne in the side of the valve hole 21a of the valve housing 21.

(3) The elastic body seal 60 is borne to the spring receiver 50 for the relief spring 25 which is brought into contact with the ball receiver 24 so as to be aligned in the axial direction. Accordingly, it is possible to easily bear the elastic body seal 60 to the side of the ball receiver 24.

In accordance with the present invention, in the relief valve, it is possible to inhibit the ball receiver from vibrating, and it is possible to make the relief pressure stable.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the elastic body seal in accordance with the present invention may be slidably brought into contact with at least one of the outer periphery of the ball receiver and the inner periphery of the valve hole. Further, the elastic body seal may be borne to the side of the valve hole.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A relief valve comprising:
   a valve housing in which a valve hole is disposed along an axis;
   a valve seat member fitted and fixed to an opening end portion of the valve hole, and in which pressurized oil discharged from a hydraulic pump is introduced to one end portion of a communication hole penetrating along an axis, a valve seat being formed in another end portion;
   a ball brought into contact with the valve seat so as to close the communication hole;
   a ball receiver holding the ball and slidably supported along an inner surface of the valve hole;
   a relief spring energizing the ball receiver in a direction in which the ball is brought into contact with the valve seat; and
   a relief hole relieving the pressure oil at the time of relieving the oil pressure, the relief hole being open in a radial direction of the valve hole,
   wherein an elastic body seal is provided so as to be sealed in an annular gap between the ball receiver and the valve hole, the elastic body seal being slidably in contact with at least one of an outer periphery of the ball receiver and an inner periphery of the valve hole such that the elastic body seal is not compressed in an axial direction of the ball receiver, and
   the elastic body seal comprises an oil seal provided with a seal lip in an outer periphery of a cored bar.

2. A relief valve according to claim 1, wherein an outer diameter of the seal lip in a free state is larger than an inner diameter of the valve hole.

3. A relief valve according to claim 1, wherein the cored rod constitutes a spring receiver for a relief spring which is movable into contact with the ball receiver so as to be aligned in an axial direction.

4. A relief valve according to claim 1, wherein a small diameter portion protrudes in a back surface side facing a side of the ball receiver with which the ball is brought into contact, and the oil seal is inserted and attached to a periphery of the small diameter portion so as to be borne.

5. A relief valve according to claim 4, wherein the cored rod has a flange portion and a rising tubular portion, an outward surface of the flange portion being formed as a spring receiving surface for the relief spring, the small diameter portion of the ball receiver being insertable to an inner periphery of the rising tubular portion, and a leading end surface of the rising tubular portion being movable into contact with the back surface of the ball receiver.

6. A relief valve according to claim 5, wherein the oil seal is structured such that a base portion of the seal lip is integrally formed in the outer periphery of the rising tubular portion by a heat induced adhesion, and a leading end portion is expanded from an inward surface of the flange portion toward an oblique outer side.

7. A relief valve according to claim 6, wherein the oil seal is structured such that a rising height in an axial direction in the leading end portion of the seal lip with respect to the flange portion of the cored rod is set lower than a rising height of the rising tubular portion with respect to the flange portion.

8. A relief valve comprising:
   a valve housing in which a valve hole is disposed along an axis;
   a valve seat member fitted and fixed to an opening end portion of the valve hole, and in which pressurized oil discharged from a hydraulic pump is introduced to one end portion of a communication hole penetrating along an axis, a valve seat being formed in another end portion;
   a ball brought into contact with the valve seat so as to close the communication hole;
   a ball receiver holding the ball and slidably supported along an inner surface of the valve hole;
   a relief spring energizing the ball receiver in a direction in which the ball is brought into contact with the valve seat; and
   a relief hole relieving the pressure oil at the time of relieving the oil pressure, the relief hole being open in a radial direction of the valve hole.
   wherein an elastic body seal is provided so as to be sealed in an annular gap between the ball receiver and the valve hole, the elastic body seal being slidably in contact with at least one of an outer periphery of the ball receiver and an inner periphery of the valve hole such that the elastic body seal is not compressed in an axial direction of the ball receiver,
   the elastic body seal is borne to a side of the ball receiver, and
   the elastic body seal comprises an oil seal provided with a seal lip in an outer periphery of a cored bar.

9. A relief valve according to claim 8, wherein an outer diameter of the seal lip in a free state is larger than an inner diameter of the valve hole.

10. A relief valve according to claim 8, wherein the cored rod comprises a spring receiver for a relief spring which is movable into contact with the ball receiver so as to be aligned in an axial direction.

11. A relief valve comprising:
    a valve housing in which a valve hole is disposed along an axis;
    a valve seat member fitted and fixed to an opening end portion of the valve hole, and in which pressurized oil discharged from a hydraulic pump is introduced to one end portion of a communication hole penetrating along an axis, a valve seat being formed in another end portion;
    a ball brought into contact with the valve seat so as to close the communication hole;
    a ball receiver holding the ball and slidably supported along an inner surface of the valve hole;
    a relief spring energizing the ball receiver in a direction in which the ball is brought into contact with the valve seat; and
    a relief hole relieving the pressure oil at the time of relieving the oil pressure, the relief hole being open in a radial direction of the valve hole.
    wherein an elastic body seal is provided so as to be sealed in an annular gap between the ball receiver and the valve hole, the elastic body seal being slidably in contact with at least one of an outer periphery of the ball receiver and an inner periphery of the valve hole such that the elastic body seal is not compressed in an axial direction of the ball receiver,
    the elastic body seal is borne to a side of the ball receiver,
    the elastic body seal is borne to a spring receiver for a relief spring which is movable into contact with the ball receiver so as to be aligned in an axial direction, and the elastic body seal comprises an oil seal provided with a seal lip in an outer periphery of a cored bar.

12. A relief valve according to claim 11, wherein an outer diameter of the seal lip in a free state is larger than an inner diameter of the valve hole.

13. A relief valve according to claim 11, wherein the cored rod comprises a spring receiver for a relief spring which is movable into contact with the ball receiver so as to be aligned in an axial direction.

14. A relief valve comprising:

a valve housing in which a valve hole is disposed along an axis;

a valve seat member fitted and fixed to an opening end portion of the valve hole, and in which pressurized oil discharged from a hydraulic pump is introduced to one end portion of a communication hole penetrating along an axis, a valve seat being formed in another end portion;

a ball brought into contact with the valve seat so as to close the communication hole;

a ball receiver holding the ball and slidably supported along an inner surface of the valve hole;

a relief spring energizing the ball receiver in a direction in which the ball is brought into contact with the valve seat; and a relief hole relieving the pressure oil at the time of relieving the oil pressure, the relief hole being open in a radial direction of the valve hole, wherein an elastic body seal is provided so as to be sealed in an annular gap between the ball receiver and the valve hole, the elastic body seal being slidably in contact with at least one of an outer periphery of the ball receiver and an inner periphery of the valve hole such that the elastic body seal is not compressed in an axial direction of the ball receiver, the elastic body seal is borne to a side of the ball receiver such that the elastic body seal is integrally formed in a spring receiver, and the elastic body seal is integrally formed around an annular portion in an outer peripheral side of one plate surface of the spring receiver and an outer peripheral portion of the spring receiver.

15. A relief valve comprising:

a valve housing in which a valve hole is disposed along an axis;

a valve seat member fitted and fixed to an opening end portion of the valve hole, and in which pressurized oil discharged from a hydraulic pump is introduced to one end portion of a communication hole penetrating along an axis, a valve seat being formed in another end portion;

a ball brought into contact with the valve seat so as to close the communication hole;

a ball receiver holding the ball and slidably supported along an inner surface of the valve hole;

a relief spring energizing the ball receiver in a direction in which the ball is brought into contact with the valve seat; and a relief hole relieving the pressure oil at the time of relieving the oil pressure, the relief hole being open in a radial direction of the valve hole, wherein an elastic body seal is provided so as to be sealed in an annular gap between the ball receiver and the valve hole, the elastic body seal being slidably in contact with at least one of an outer periphery of the ball receiver and an inner periphery of the valve hole such that the elastic body seal is not compressed in an axial direction of the ball receiver, the elastic body seal is borne to a side of the ball receiver such that the elastic body seal is integrally formed in a spring receiver, and the elastic body seal comprises an annular portion in an outer peripheral side of one plate surface of the spring receiver and a rubber body integrally formed around an outer peripheral portion of the spring receiver.

\* \* \* \* \*